United States Patent
Chen et al.

(10) Patent No.: US 11,009,957 B2
(45) Date of Patent: May 18, 2021

(54) HAPTIC DEVICE OPERATION

(71) Applicant: Ford Global Technologies, LLC, Dearborn, MI (US)

(72) Inventors: Yifan Chen, Ann Arbor, MI (US); Abhishek Sharma, Plymouth, MI (US); Qianyi Wang, Allen Park, MI (US); Steven Lin, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/626,700

(22) PCT Filed: Jun. 27, 2017

(86) PCT No.: PCT/US2017/039390
§ 371 (c)(1),
(2) Date: Dec. 26, 2019

(87) PCT Pub. No.: WO2019/005003
PCT Pub. Date: Jan. 3, 2019

(65) Prior Publication Data
US 2020/0159328 A1 May 21, 2020

(51) Int. Cl.
*B60W 50/16* (2020.01)
*G06F 3/01* (2006.01)
*G06F 3/16* (2006.01)
*G06F 1/16* (2006.01)

(52) U.S. Cl.
CPC .............. *G06F 3/016* (2013.01); *B60W 50/16* (2013.01); *G06F 3/167* (2013.01); *G06F 1/163* (2013.01)

(58) Field of Classification Search
CPC ........ B60W 50/16; G06F 1/163; G06F 3/016; G06F 3/167; G10H 2220/116; G10H 2220/311
USPC ................................ 381/86; 84/609; 700/301
See application file for complete search history.

(56) References Cited

U.S. PATENT DOCUMENTS

| | | | |
|---|---|---|---|
| 8,294,557 B1 | 10/2012 | El Saddik et al. | |
| 8,712,383 B1 | 4/2014 | Hayes et al. | |
| 9,283,847 B2 | 3/2016 | Riley, Sr. et al. | |
| 9,542,781 B2 | 1/2017 | Hatton | |
| 2003/0068053 A1 | 4/2003 | Chu | |
| 2007/0193436 A1 | 8/2007 | Chu | |

(Continued)

FOREIGN PATENT DOCUMENTS

WO   2016166570 A1   10/2016

OTHER PUBLICATIONS

McGraw, K., et al., "How to Create and Customize Vibration Alerts on Your iPhone," www.imore.com, Mar. 31, 2017, 7 pages.

(Continued)

*Primary Examiner* — Vivian C Chin
*Assistant Examiner* — Friedrich Fahnert
(74) *Attorney, Agent, or Firm* — Brandon Hicks; Bejin Bieneman PLC

(57) ABSTRACT

A system includes a computer programmed to identify a plurality of audio amplitudes of an audio input. The computer is programmed to identify a plurality of time intervals of the audio input between respective identified audio amplitudes. The computer is programmed to map a haptic pattern based on identified audio amplitudes and the time intervals. The computer is programmed to actuate a motor to output the haptic pattern.

20 Claims, 6 Drawing Sheets

(56) References Cited

U.S. PATENT DOCUMENTS

| | | |
|---|---|---|
| 2011/0202155 A1 | 8/2011 | Ullrich et al. |
| 2013/0116852 A1* | 5/2013 | Dijk .................. G06F 3/011 |
| | | 700/301 |
| 2013/0342330 A1 | 12/2013 | Kiefer et al. |
| 2016/0167578 A1 | 6/2016 | Park |
| 2016/0207454 A1 | 7/2016 | Cuddihy et al. |
| 2017/0010672 A1 | 1/2017 | Tanaka et al. |
| 2017/0055110 A1 | 2/2017 | Tian et al. |

OTHER PUBLICATIONS

International Search Report of the International Searching Authority for PCT/US2017/039390 dated Sep. 5, 2017.

* cited by examiner

HAPTIC DEVICE OPERATION

BACKGROUND

Electronic devices may include haptic devices. The haptic devices can be programmed to generate a vibrating pattern that vibrates the electronic device to provide haptic output. However, a problem is that current systems have limited capability to generate various haptic outputs.

DETAILED DESCRIPTION

Figure 1:
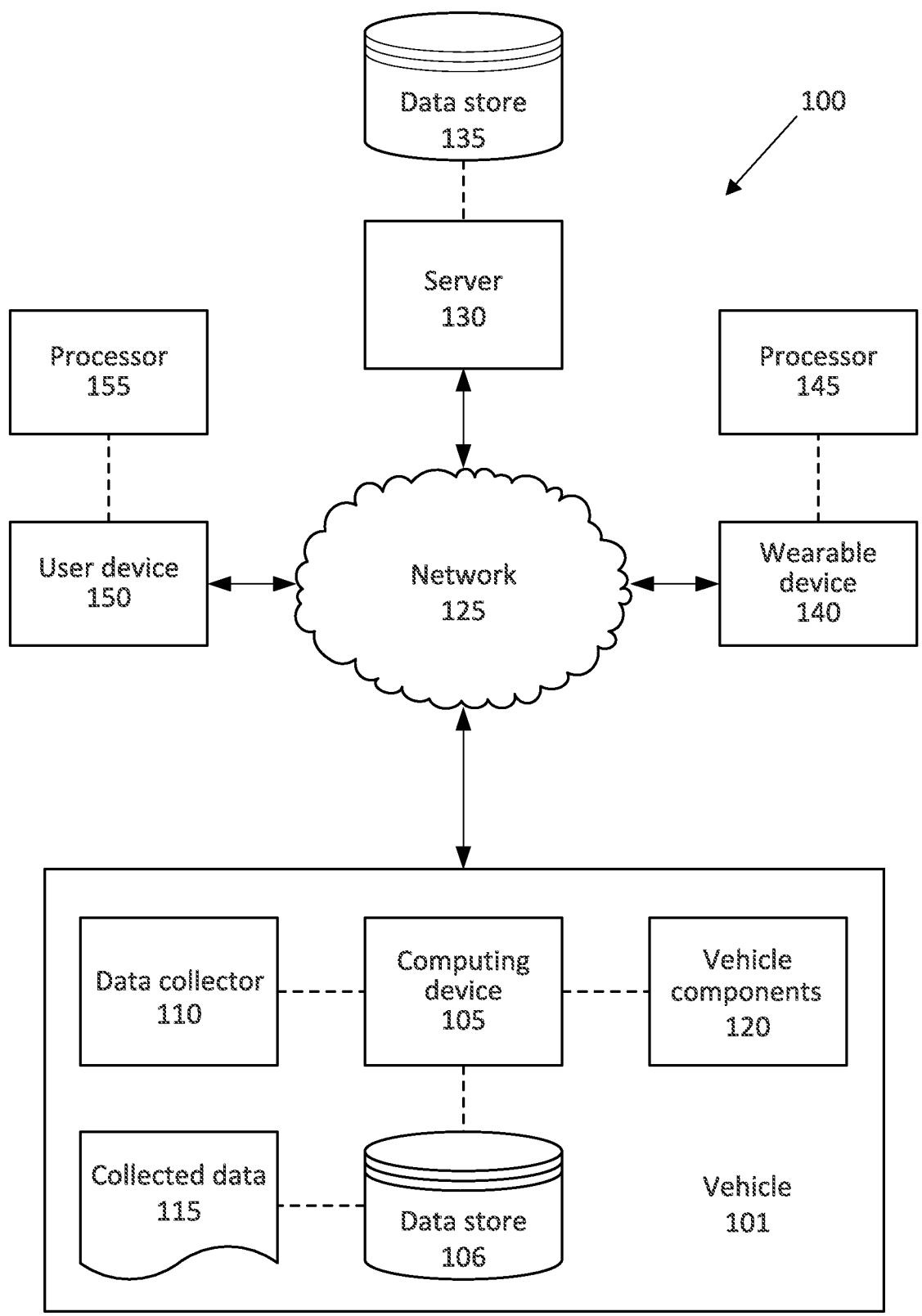
FIG. 1 is a block diagram of an example system for actuating a wearable device.

A system includes a computer programmed to identify a plurality of audio amplitudes of an audio input, identify a plurality of time intervals of the audio input between respective identified audio amplitudes, map a haptic pattern based on identified audio amplitudes and the time intervals, and actuate a motor to output the haptic pattern.

The computer can be further programmed to identify a frequency band for the audio input and to apply a filter to the audio input based on the frequency band. The computer can be further programmed to identify the time intervals based on the filtered audio input.

The computer can be further programmed to identify a plurality of dominant frequencies of the filtered audio input. The computer can be further programmed to identify the time intervals based on an identified time when respective audio amplitudes of two of the plurality of dominant frequencies are a same amplitude.

The computer can be further programmed to identify a second frequency band and to apply a second filter to the audio input based on the second frequency band. The computer can be further programmed to map a first haptic pattern based on the filtered audio input and a second haptic pattern based on the second filtered audio input.

The computer can be further programmed to adjust a rotation speed of the motor based on the haptic pattern.

Upon determining that a time duration of the audio input exceeds a duration threshold, the computer can be further programmed to receive a user input identifying a portion of the audio input having a time duration less than the duration threshold and to map a haptic pattern based on the identified portion of the audio input.

The motor can be disposed in a portable device and the computer can be further programmed to instruct the portable device to actuate the motor to output the haptic pattern.

A method includes identifying a plurality of audio amplitudes of an audio input, identifying a plurality of time intervals of the audio input between respective identified audio amplitudes, mapping a haptic pattern based on identified audio amplitudes and the time intervals, and actuating a motor to output the haptic pattern.

The method can further include identifying a frequency band for the audio input and applying a filter to the audio input based on the frequency band. The method can further include identifying the time intervals based on the filtered audio input.

The method can further include identifying a plurality of dominant frequencies of the filtered audio input. The method can further include identifying the time intervals based on an identified time when respective audio amplitudes of two of the plurality of dominant frequencies are a same amplitude.

The method can further include identifying a second frequency band, and applying a second filter to the audio input based on the second frequency band. The method can further include mapping a first haptic pattern based on the filtered audio input and a second haptic pattern based on the second filtered audio input.

The method can further include adjusting a rotation speed of the motor based on the haptic pattern.

Upon determining that a time duration of the audio input exceeds a duration threshold, the method can further include receiving a user input identifying a portion of the audio input having a time duration less than the duration threshold and mapping a haptic pattern based on the identified portion of the audio input.

The motor can be disposed in a portable device and the method can further include instructing the portable device to actuate the motor to output the haptic pattern.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

FIG. 1 illustrates an example system 100 for mapping a haptic pattern for a wearable device 140 based on an audio input. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

As used herein, the term "map" when used as a verb in the context of mapping haptic patterns means "assigning to an action." The computer 105 "maps" the haptic pattern to an action such that when the action is identified, the computer 105 outputs the haptic pattern. The action can be an event and/or condition that can require user attention, as described below.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a location of an object, determining the presence of a user, etc. The sensors 110 could also include short range radar, long range radar, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

When the computing device 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computing device 105. A semi-autonomous mode is one in which at least one of vehicle 101 propulsion (typically via a powertrain including an electric motor and/or internal combustion engine), braking, and steering are controlled at least partly by the computing device 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The system 100 may include a wearable device 140. As used herein, a "wearable device" is a portable computing device including a structure so as to be wearable on a person's body (e.g., as a watch or bracelet, as a pendant, etc.), and that includes a memory, a processor, a display, and one or more input mechanisms, such as a touchscreen, buttons, etc., as well as hardware and software for wireless communications such as described herein. A wearable device 140 is of a size and shape to be fitted to or worn on a person's body, e.g., a watch-like structure including bracelet straps, etc., and as such typically has a smaller display than a user device 150, e.g., ⅓ or ¼ of the area. For example, the wearable device 140 may be a watch, a smart watch, a vibrating apparatus, etc. that includes capabilities for wireless communications using IEEE 802.11, Bluetooth®, BLE, and/or cellular communications protocols. Further, the wearable device 140 may use such communications capabilities to communicate via the network 125 and also directly with a vehicle computer 105, e.g., using Bluetooth®. The wearable device 140 includes a wearable device processor 145.

The system 100 may include a user device 150. As used herein, a "user device" is a portable, non-wearable computing device that includes a memory, a processor, a display, and one or more input mechanisms, such as a touchscreen, buttons, etc., as well as hardware and software for wireless communications such as described herein. That the user device 150 is "non-wearable" means that it is not provided with any structure to be worn on a person's body; for example, a smart phone user device 150 is not of a size or shape to be fitted to a person's body and typically must be carried in a pocket or handbag, and could be worn on a person's body only if it were fitted with a special case, e.g., having an attachment to loop through a person's belt, and hence the smart phone user device 150 is non-wearable. Accordingly, the user device 150 may be any one of a variety of computing devices including a processor and a memory, e.g., a smartphone, a tablet, a personal digital assistant, etc. The user device 150 may use the network 125 to communicate with the vehicle computer 105 and the wearable device 140. For example, the user device 150 and wearable device 140 can be communicatively coupled to each other and/or to the vehicle computer 105 with wireless technologies such as described above. The user device 150 includes a user device processor 155.

As used herein, a "haptic pattern" is a set of instructions for activating and deactivating a motor (e.g., an electrically powered eccentric rotating motor) to generate a specific pattern of vibrations.

Figure 2:
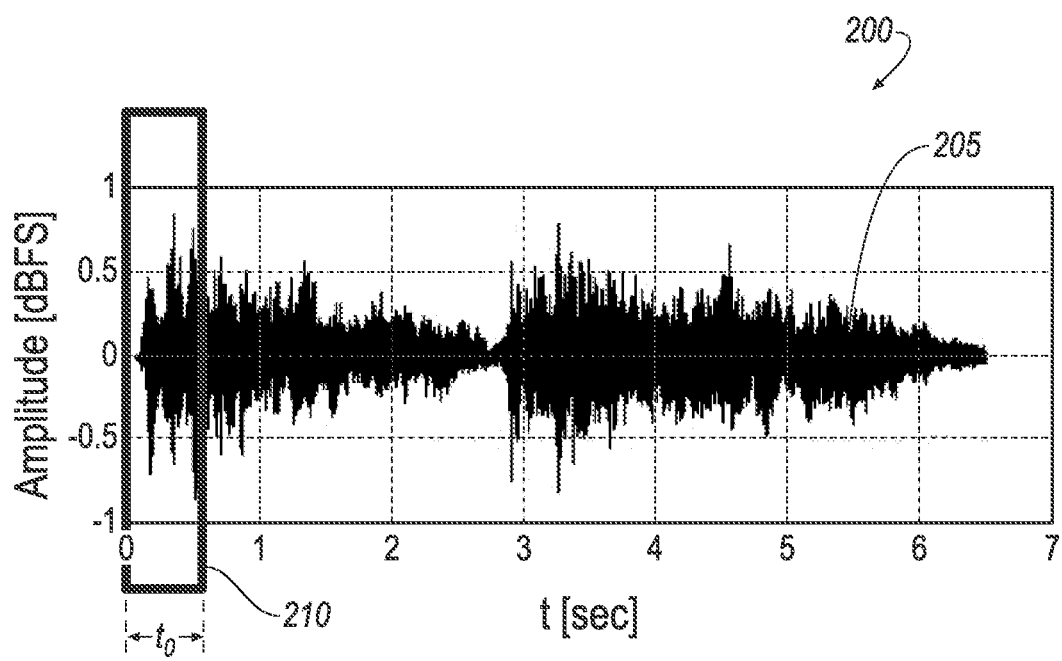
FIG. 2 illustrates an example audio input in a time domain.

FIG. 2 illustrates a chart 200 of an example audio input 205 collected by the user device 150 and/or the wearable device 140. The audio input 205 may be, e.g., a prerecorded audio file, an input from a microphone in the user device 150, etc. The computer 105 and/or the user device processor 155 can receive a user input identifying a portion 210 of the audio input 205. The user can select a prompt on a screen of the user device 150 to record an audio input (e.g., a speech input) with the microphone in the user device 150 and/or the wearable device 140. Alternatively, the user can select a prerecorded audio file stored in a data store (not shown) of the user device 150. The audio input 205 is shown in FIG. 2 as a chart with amplitude in decibels relative to full scale (dBFS), as is known, on the vertical axis and time in seconds (s) on the horizontal axis. A portion 210 of the audio input 205 can be isolated to determine a haptic pattern. The portion 210 of the audio input 205 can be determined based on a time duration threshold $t_0$ that the computer 105 and/or the user device processor 155 has previously determined as a length of the haptic pattern. Audio inputs 200 can have different time durations, and the haptic pattern can be determined based on a specific, previously determined time duration threshold $t_0$. Thus, the haptic patterns determined from a plurality of audio inputs 200 can have the same time duration. For example, the haptic pattern can have a time duration of 500 milliseconds (ms), and the audio input 205 can have a time duration greater than 500 ms, e.g., 5000 ms.

The user can provide input indicating a 500 ms portion 210 of the audio input 205 from which the user device processor 155 can map the haptic pattern. For example, as shown in FIG. 2, the audio input 205 can be shown on a touchscreen display of the user device 150, and the box indicated as the portion 210 can be moved along the horizontal axis of the audio input 205 by a tactile input on the touchscreen display of the user device 150. The user can select the portion 210 of the audio input 205 by moving the box along the touchscreen display to a preferred portion of the audio input 205. Furthermore, the user device processor 155 can determine a plurality of haptic patterns, each having a time duration of $t_0$, successively determined for the entire time duration or a smaller portion of the audio input 205. For example, the user device processor 155 can determine to map a haptic patter for 3000 ms of an audio input 205 having a time duration of 5000 ms. The user device processor 155 can map a haptic pattern for each 500 ms portion 210 of the audio input 205 until the duration of all of the haptic patterns is 3000 ms, i.e., 6 haptic patterns. The user device processor 155 can then store the 6 haptic patterns of 500 ms time duration as a single haptic pattern of 3000 ms time duration. Alternatively, the computer 105 and/or the user device processor 155 can select the portion 210 of the audio input 205, e.g., the first 500 ms of the audio input 205.

Figure 3:
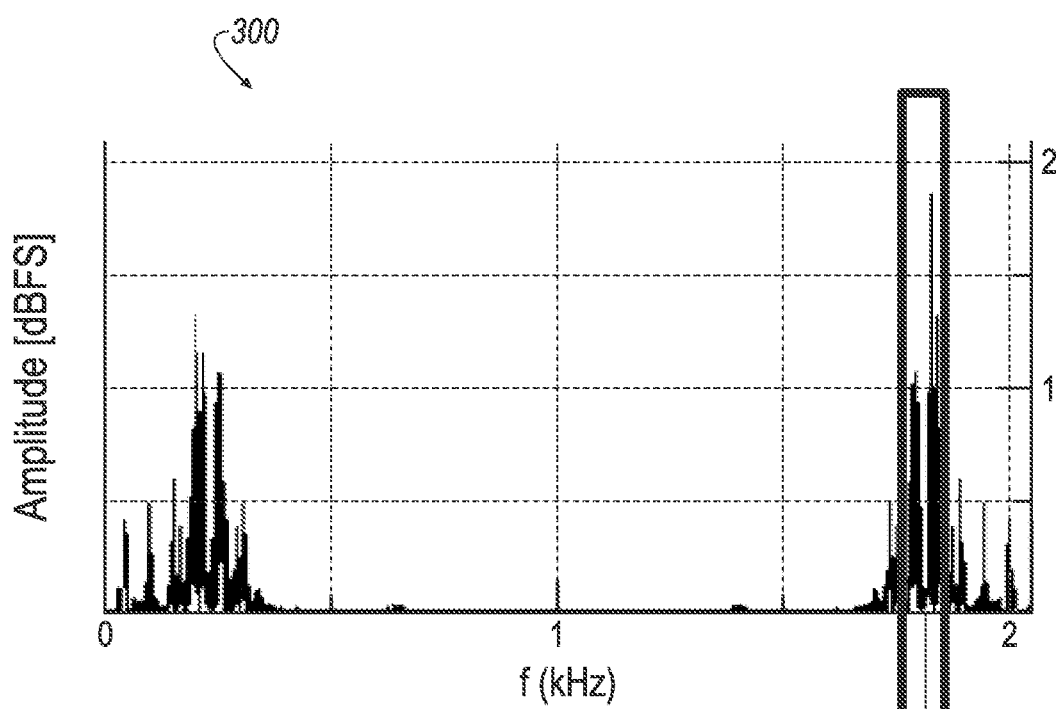
FIG. 3 illustrates the audio input of FIG. 2 in a frequency domain.

FIG. 3 illustrates a chart 300 of frequencies of the example portion 210 of the audio input 205. The chart 300 of FIG. 3 has an amplitude in dBFS of the audio input on the vertical axis and a frequency in kilohertz (kHz) of the audio input on the horizontal axis. The portion 210 of the audio input 205, identified in FIG. 2, can be broken into its component frequencies and amplitudes for each component frequency using known techniques, e.g., a Fast Fourier Transform (FFT), a Laplace Transform, a Z-transform, etc. The user device processor 155 can identify a frequency having a greatest amplitude, i.e., the dominant frequency f'. As used herein, the "dominant" frequency is the frequency having the greatest amplitude in the portion 210. The user device processor 155 can determine a dominant frequency band as [f'−f*, f'+f*], where f* is a predetermined offset defining the width of the dominant frequency band. Alternatively, the user device processor 155 can identify another frequency $f_0$ and determine a frequency band [$f_0$−f*, $f_0$+f*]. The user device processor 155 can identify a plurality of dominant frequency bands based on identified frequencies f' for the plurality of portions 210 of the audio input 205.

Figure 4:
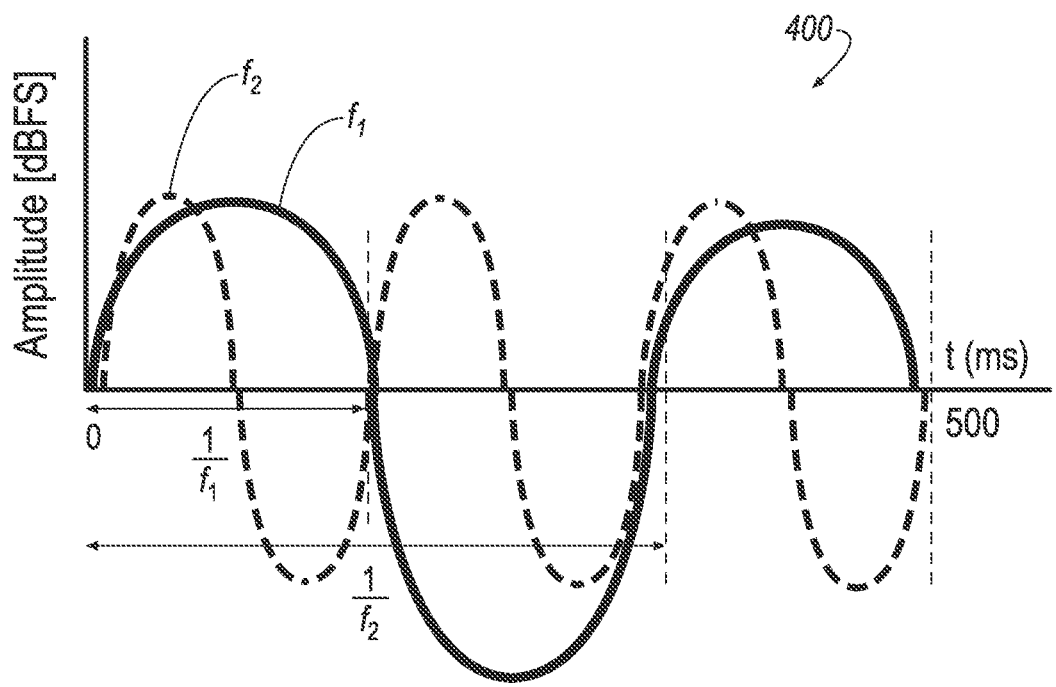
FIG. 4 illustrates a plurality of dominant frequencies of the audio input.

FIG. 4 illustrates a chart 400 of amplitudes of example frequencies $f_1$, $f_2$ in the dominant frequency band over the time duration $t_0$ of the portion 210 of the audio input 205. The chart 400 in FIG. 4 shows the amplitude in dBFS on the vertical axis and time in seconds on the horizontal axis. The user device processor 155 can isolate the frequencies by applying a filter to the portion 210 of the audio input 205 based on the dominant frequency band, e.g., a band-pass filter. When the filter is a band-pass filter, the filter removes frequencies from the portion 210 of the audio input 205 that are outside of the dominant frequency band. The frequencies $f_1$, $f_2$ shown in FIG. 4 are exemplary frequencies representing two of the plurality of frequencies in the dominant frequency band. The user device processor 155 can identify a different number of frequencies. Alternatively or additionally, the computer 105 can apply a plurality of band pass filters based on a plurality of determined dominant frequency bands to generate a plurality of filtered audio inputs, e.g., a second filtered audio input based on a second frequency band based on the frequency $f_2$, [$f_2$−f*, $f_2$+f*].

Figure 5:
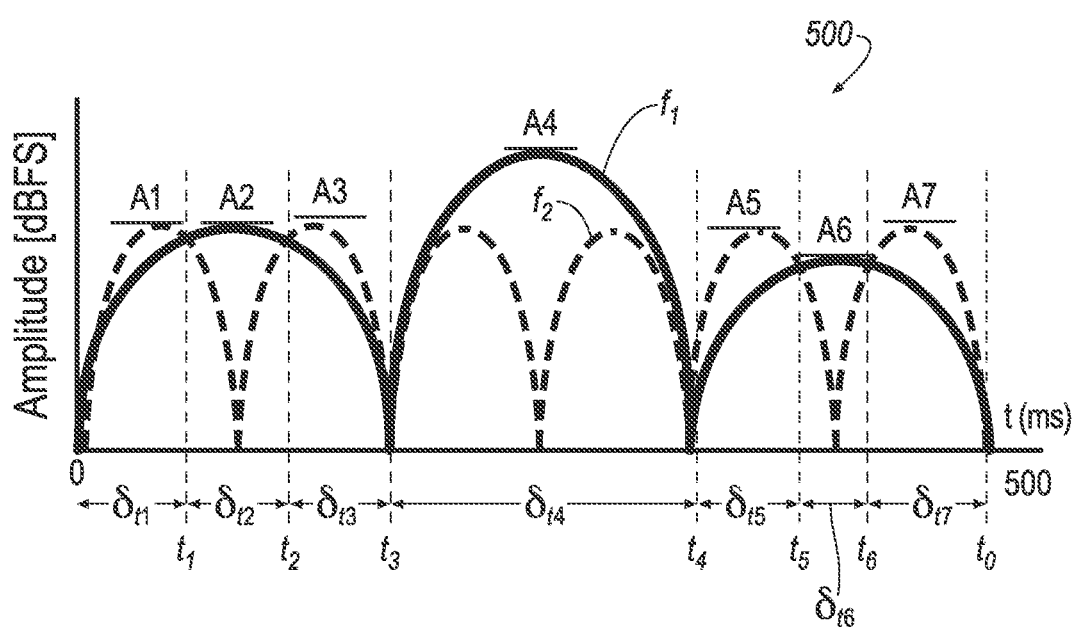
FIG. 5 illustrates a plurality of time intervals determined based on the dominant frequencies.

FIG. 5 illustrates a chart 500 of the absolute value of the amplitudes of the audio input 205 and time intervals δ determined by comparing amplitudes of frequencies in the dominant frequency band. As shown in FIG. 4, the portion 210 of the audio input 205 can be represented as two frequencies, $f_1$, $f_2$ in the dominant frequency band. The user device processor 155 can identify a plurality of time values t when the amplitude of the frequency $f_1$ equals the amplitude of the secondary frequency $f_2$. The user device processor 155 can determine a plurality of time intervals δ elapsed between two consecutive time values t, between the start of the audio input and the first time value t, and between the last time value t and the end of the audio input 205. That is, when the amplitude of one of the frequencies $f_1$, $f_2$ begins to exceed the amplitude of the other of the frequencies $f_1$, $f_2$, the user device processor 155 can define that time value t as the start of a new time interval δ. In the example of FIG. 5, the amplitudes of the frequencies $f_1$, $f_2$ intersect at six time values $t_1$, $t_2$, $t_3$, $t_4$, $t_5$, $t_6$, that define seven time intervals $δ_{t1}$, $δ_{t2}$, $δ_{t3}$, $δ_{t4}$, $δ_{t5}$, $δ_{t6}$, $δ_{t7}$. When the user device processor 155 identifies a plurality of frequencies (e.g., $f_1$, $f_2$, $f_3$, ... $f_n$ for n frequencies) in the dominant frequency band, the user device processor 155 defines the next time interval $δ_t$ based on the time value t when the frequency having the highest amplitude differs from the frequency having the highest amplitude of the previous time value t, i.e., when the frequency having the highest amplitude changes.

Within each time interval δ, the computer 105 can identify an interval dominant frequency, i.e., the frequency that has the highest amplitude in the portion defined by the specific time interval $δ_t$, having an interval dominant amplitude A. For example, in the time interval $δ_{t1}$, the interval dominant frequency is the frequency $f_2$ having an interval dominant amplitude $A_1$. That is, the dominant frequency of the entire audio input 205 may not be the interval dominant frequency for a specific time interval δ.

Figure 6:
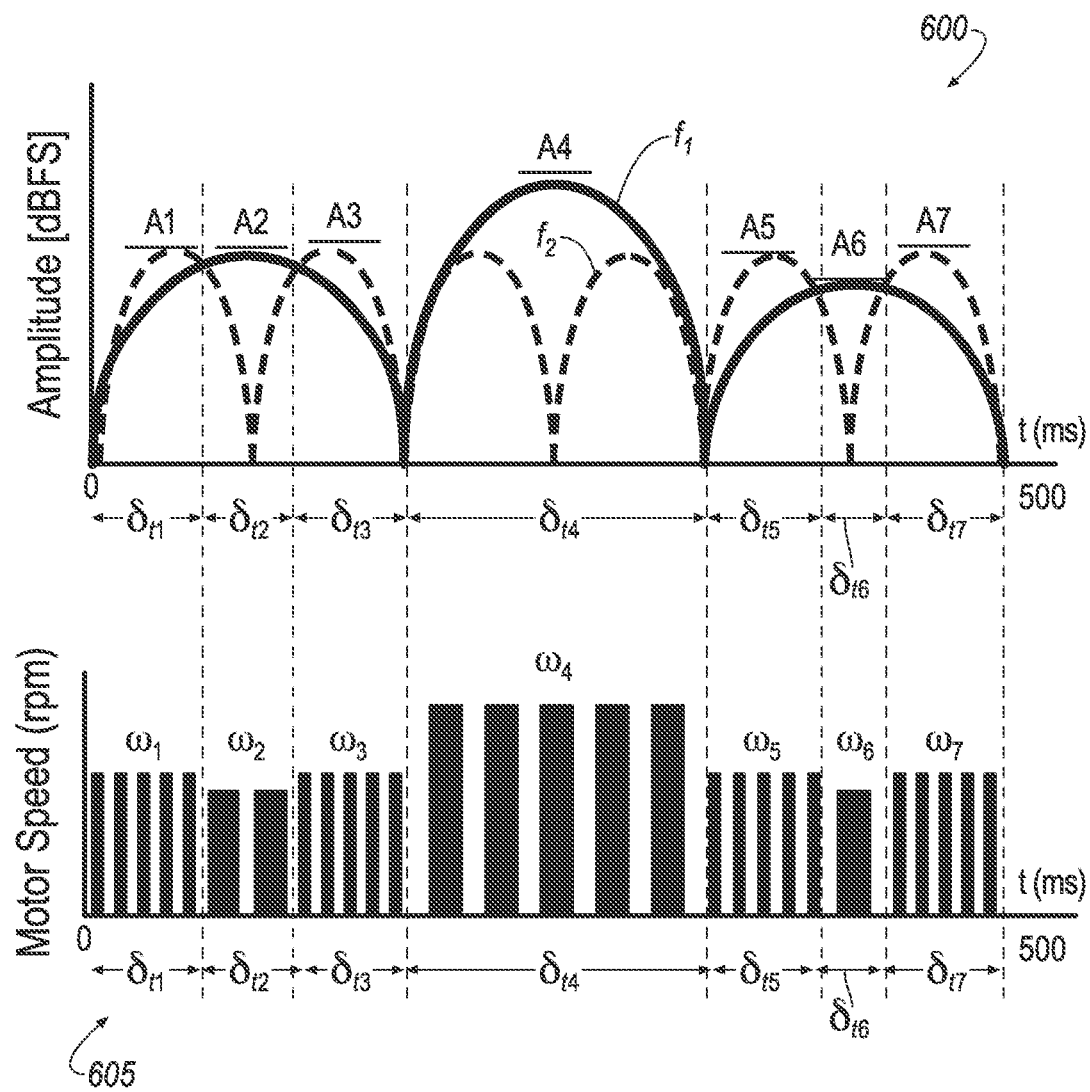
FIG. 6 illustrates a haptic pattern mapped based on the time intervals and the dominant frequencies.

FIG. 6 illustrates a chart 600 showing the computer 105 determining a haptic pattern 605 from the identified interval dominant amplitudes $A_1$-$A_7$ of the dominant frequencies. The haptic pattern 605 is shown as a chart having time in ms on the horizontal axis and motor rotation speed ω in revolutions per minute (rpm) on the vertical axis. For each time interval $δ_t$, the computer 105 and/or the user device processor 155 assigns a motor speed ω based on the amplitude A of the interval dominant frequency of the time interval $δ_t$. In the example of FIG. 6, the haptic pattern 605 defines seven motor speeds $ω_1$, $ω_2$, $ω_3$, $ω_4$, $ω_5$, $ω_6$, $ω_7$. As described below, an eccentric motor 700 can be actuated according to speeds ω of the haptic pattern. The computer 105 and/or the user device processor 155 can determine an interval pattern for each time interval δ based on the interval dominant frequency. The interval dominant frequency can define a pattern of actuating the motor 700 on and off based on the amplitude and value of the interval dominant frequency.

The example haptic pattern 605 is shown as a square wave, where the wearable device processor 145 is programmed to actuate the motor 700 at the motor speed co at the start of each nonzero portion of square wave and to deactivate the motor 700 at the end of each nonzero portion of the square wave. The length along the time axis of the nonzero portion of the square wave is defined as the "pulse width." The pulse width of the square wave is based on a ratio of the interval dominant frequency of the current time interval δ to the dominant frequency:

$$\text{Pulse width} = \frac{f'_\delta}{f'_{\delta,max}} \cdot \frac{1}{f'} \quad (1)$$

where $f'_\delta$ is the interval dominant frequency, $f'_{\delta,max}$ is the maximum interval dominant frequency of the time intervals δ, and f' is the dominant frequency of the audio input 205.

The motor speed ω can be based on a ratio of the amplitude of the interval dominant frequency to a maximum amplitude of the interval dominant frequencies in the audio input 205:

$$\omega = \frac{A_\delta}{A_{max}} \cdot \omega_{max} \quad (2)$$

where $A_\delta$ is the amplitude A for the specific time interval δ, $A_{max}$ is the maximum amplitude of the determined amplitudes A for the portion 210 of the audio input 205, and $\omega_{max}$ is a maximum rated speed at which the motor 700 can rotate.

For example, in the time interval $\delta_{t1}$, the frequency $f_2$ is the interval dominant frequency. The frequency of the square wave can be proportional to interval dominant frequency, in this case $f_2$ and motor speed, $\omega_1$ can be proportional to the amplitude $A_1$ in the time interval $\delta_{t1}$. In the time interval $\delta_{t2}$, the frequency $f_1$ is the interval dominant frequency. In the haptic pattern 605, the frequency of the square wave can be proportional to interval dominant frequency, $f_1$ and motor speed, $\omega_2$ can be proportional to the amplitude $A_2$ in the time interval $\delta_{t2}$. The interval pattern for the time interval $\delta_{t1}$, based on the frequency $f_2$, will thus be faster than the interval pattern for the time interval $\delta_{t2}$ because the frequency $f_2$ is greater than the frequency $f_1$. Alternatively or additionally, the computer 105 and/or the user device processor 155 can determine a plurality of haptic patterns based on the plurality of filtered audio inputs generated from the plurality of identified frequencies f, e.g., a second haptic pattern based on the second filtered audio input based on the second frequency band [$f_2-f^*$, $f_2+f^*$].

Figure 7:
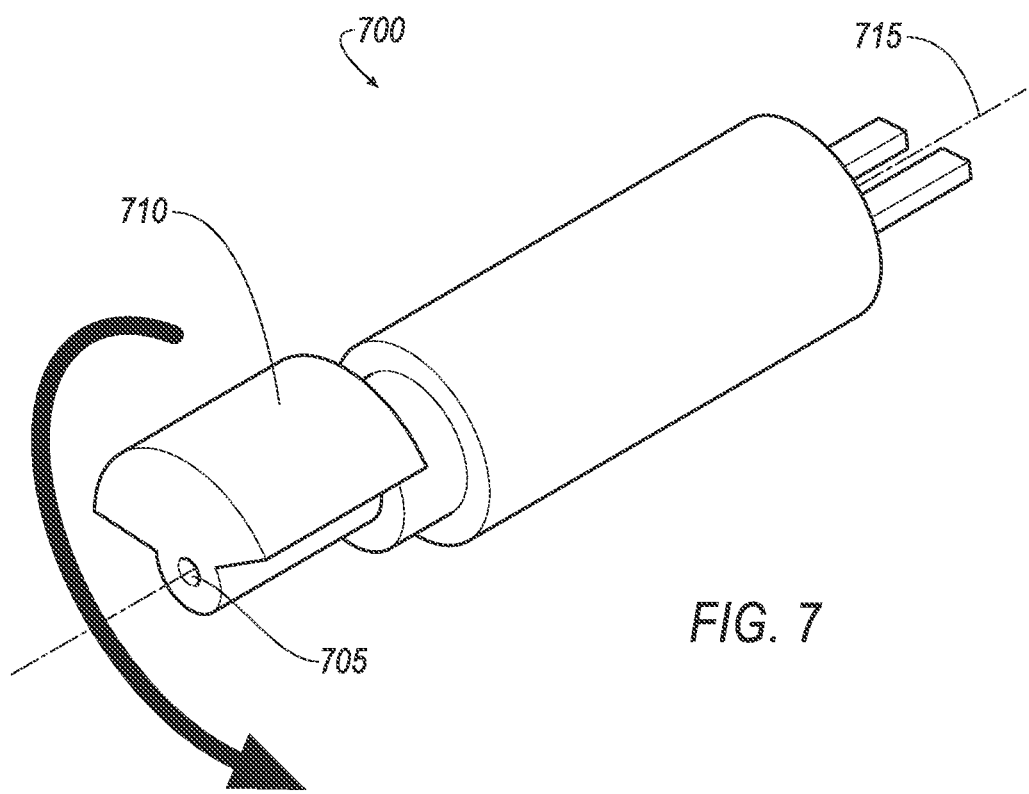
FIG. 7 illustrates an example motor installed in the wearable device.

FIG. 7 illustrates an example motor 700 that can be installed in the wearable device 140 and/or the user device 150 and actuated to output the haptic pattern 605. The motor 700 can include a shaft 705 and an eccentric weight 710 fixed to the shaft. The eccentric weight is asymmetric about a motor axis 715. When the shaft 705 rotates the eccentric weight 710, the eccentric weight 710 can generate a centripetal force that shakes the motor 700 and the wearable device 140. The wearable device processor 145 can be programmed to rotate the shaft 705 to output the haptic pattern 605, as described above, generating changing centripetal forces that can be detected by a user.

The computer 105 and/or the user device processor 155 can map the haptic pattern 605 to an action. The action can be an event and/or condition that can require user attention. Upon identification of the action, the computer 105 and/or the user device processor 155 can prompt the user by actuating the motor 700 to output the haptic pattern 605. The action can be, e.g., vehicle component 120 data 115 (e.g., a vehicle 101 speed, a vehicle 101 acceleration, etc.) exceeding a threshold, a time of an appointment stored in a calendar, arrival at a location stored in the data store 106, etc. Because the haptic pattern 605 can be specific to the audio input 205, the user can recognize a specific action based on the haptic pattern 605. The computer 105 and/or the user device processor 155 can map a plurality of haptic patterns 605 to a plurality of actions.

Figure 8:
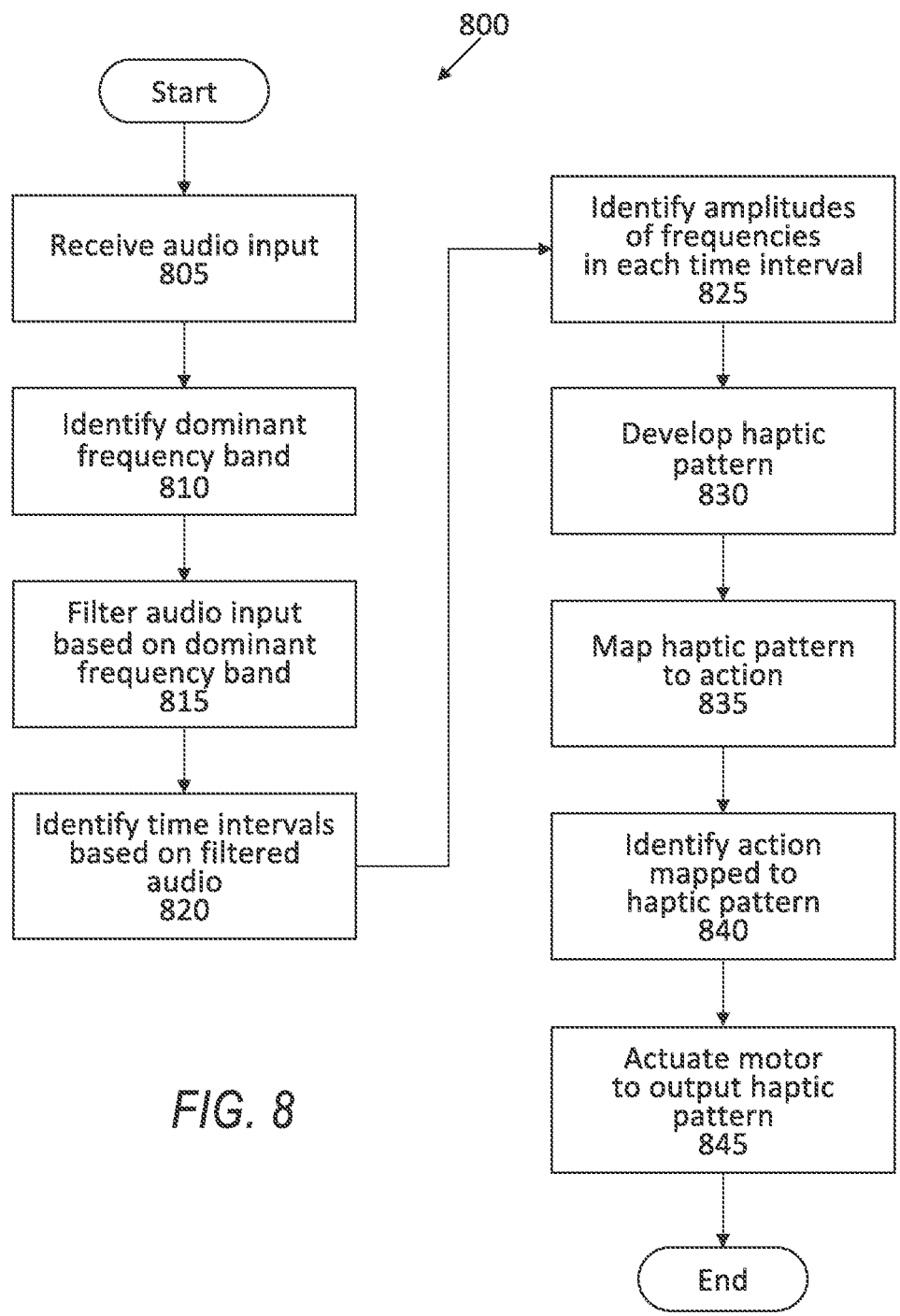
FIG. 8 is a block diagram of an example process for determining the haptic pattern.

FIG. 8 illustrates an example process 800 for determining a haptic pattern 605 for a motor 700 in a wearable device 140. The process 800 begins in a block 805, in which the computer 105 and/or the user device processor 155 receive an audio input 205. The audio input 205 may be, e.g., a prerecorded audio file, an input from a microphone in the user device 150, etc. The computer 105 and/or the user device processor 155 can receive a user input identifying a portion 210 of the audio input 205. As described above, the user device processor 155 can prompt the user to provide an audio input 205 and/or to identify a portion 210 of the audio input 205 with a tactile input on a user device 150 touchscreen display.

Next, in a block 810, the computer 105 and/or the user device processor 155 identifies a dominant frequency f' and a dominant frequency band [$f'-f^*$, $f'+f^*$] for the audio input 205 based on the dominant frequency f' of the audio input 205. The computer 105 and/or the user device processor 155 can identify the dominant frequency f' by applying a known transform technique, e.g., FFT, to the audio input 205 and determining the frequency for maximum value of amplitude.

Next, in a block 815, the computer 105 and/or the user device processor 155 filters the audio input 205 with a band-pass filter based on the dominant frequency band. As described above, the band-pass filter can remove frequencies from the audio input 205 that are outside the dominant frequency band.

Next, in a block 820, the computer 105 and/or the user device processor 155 identifies one or more time intervals δ based on dominant frequencies of the filtered audio input 205. As described above, the time intervals δ are based on time values t when an amplitude of one of the dominant frequencies is equal to an amplitude of another of the dominant frequencies.

Next, in a block 825, the computer 105 and/or the user device processor 155 identifies the interval dominant frequency for each time interval δ and identifies the amplitude A of each interval dominant frequency. As described above, the interval dominant frequency is the dominant frequency during the time interval δ.

Next, in a block 830, the computer 105 and/or the user device processor 155 maps the haptic pattern 605. The computer 105 and/or the user device processor 155 maps the haptic pattern 605 based on the amplitudes, the interval dominant frequencies, and the dominant frequency, as described above. Each amplitude A can define a motor speed ω and a pulse width for each time interval δ in the haptic pattern 605 that the motor 700 rotates according to a square wave defined by the interval dominant frequency and the amplitude.

Next, in a block 835, the computer 105 and/or the user device processor 155 maps an action to the haptic pattern 605. The action can be an event and/or condition that, upon identification, causes the computer 105 and/or the user device processor 155 to prompt the user by actuating the motor 700 to output the haptic pattern 605. The action can be, e.g., vehicle component 120 data 115 (e.g., a vehicle 101 speed, a vehicle 101 acceleration, etc.) exceeding a threshold, a time of an appointment stored in a calendar, arrival at a location stored in the data store 106, etc.

Next, in a block 840, the computer 105 and/or the user device processor 155 identifies that the action mapped to the haptic pattern 605 has occurred. The computer 105 and/or the user device processor 155 can, based on collected data 115 (e.g., speed data 115, location data 115, time data 115, etc.) determine that the action has occurred, e.g., the vehicle 101 speed has exceeded a speed threshold, a time of an appointment has arrived, etc. The computer 105 and/or the user device processor 155 can communicate over the network 125 to determine that the action has occurred.

Next, in a block 845, the computer 105 and/or the user device processor 155 instructs the wearable device processor 145 to actuate the motor 700 to output the haptic pattern 605. The computer 105 and/or the user device processor 155 can send the haptic pattern 605 over the network 125 to the wearable device processor 145. The wearable device processor 145 can then actuate the motor 700 according to the haptic pattern 605. Following the block 845, the process 800 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computing device 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 800, one or more of the steps could be omitted, or the steps could be executed in a different order than shown in FIG. 8. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer programmed to:
identify a plurality of audio amplitudes of an audio input;
identify a plurality of time intervals of the audio input between respective identified audio amplitudes;
generate a haptic pattern based on the identified audio amplitudes and the identified time intervals;
map the haptic pattern to an action that is based on vehicle component data; and
upon identifying the action based on received vehicle component data, actuate a motor to output the haptic pattern.

2. The system of claim 1, wherein the computer is further programmed to identify a frequency band for the audio input and to apply a filter to the audio input based on the frequency band.

3. The system of claim 2, wherein the computer is further programmed to identify the time intervals based on the filtered audio input.

4. The system of claim 2, wherein the computer is further programmed to identify a plurality of dominant frequencies of the filtered audio input.

5. The system of claim 4, wherein the computer is further programmed to identify the time intervals based on an identified time when respective audio amplitudes of two of the plurality of dominant frequencies are a same amplitude.

6. The system of claim 2, wherein the computer is further programmed to identify a second frequency band, and to apply a second filter to the audio input based on the second frequency band.

7. The system of claim 6, wherein the computer is further programmed to map a first haptic pattern based on the filtered audio input and a second haptic pattern based on the second filtered audio input.

8. The system of claim 1, wherein the computer is further programmed to adjust a rotation speed of the motor based on the haptic pattern.

9. The system of claim 1, wherein, upon determining that a time duration of the audio input exceeds a duration threshold, the computer is further programmed to receive a user input identifying a portion of the audio input having a time duration less than the duration threshold and to map a haptic pattern based on the identified portion of the audio input.

10. The system of claim 1, wherein the motor is disposed in a portable device and the computer is further programmed to instruct the portable device to actuate the motor to output the haptic pattern.

11. The system of claim 1, wherein the haptic pattern includes respective pluralities of pulses within each of the plurality of time intervals, each pulse of each plurality of pulses having a respective magnitude based on the audio amplitudes in the time interval and a respective pulse width based on a dominant frequency of the audio input in the time interval.

12. A method, comprising:
identifying a plurality of audio amplitudes of an audio input;
identifying a plurality of time intervals of the audio input between respective identified audio amplitudes;
generating a haptic pattern based on the identified audio amplitudes and the identified time intervals;
mapping the haptic pattern to an action that is based on vehicle component data; and
upon identifying the action based on received vehicle component data, actuating a motor to output the haptic pattern.

13. The method of claim 12, further comprising identifying a frequency band for the audio input and applying a filter to the audio input based on the frequency band.

14. The method of claim 13, further comprising identifying the time intervals based on the filtered audio input.

15. The method of claim 13, further comprising identifying a plurality of dominant frequencies of the filtered audio input.

16. The method of claim 15, further comprising identifying the time intervals based on an identified time when respective audio amplitudes of two of the plurality of dominant frequencies are a same amplitude.

17. The method of claim 13, further comprising identifying a second frequency band, and applying a second filter to the audio input based on the second frequency band.

18. The method of claim 17, further comprising mapping a first haptic pattern based on the filtered audio input and a second haptic pattern based on the second filtered audio input.

19. The method of claim 12, wherein, upon determining that a time duration of the audio input exceeds a duration threshold, the method further comprises receiving a user input identifying a portion of the audio input having a time duration less than the duration threshold and mapping a haptic pattern based on the identified portion of the audio input.

20. The method of claim 12, wherein the haptic pattern includes respective pluralities of pulses within each of the plurality of time intervals, each pulse of each plurality of pulses having a respective magnitude based on the audio amplitudes in the time interval and a respective pulse width based on a dominant frequency of the audio input in the time interval.

* * * * *